Nov. 6, 1928.
H. DORNER
INJECTION NOZZLE
Filed July 27, 1925
1,690,893
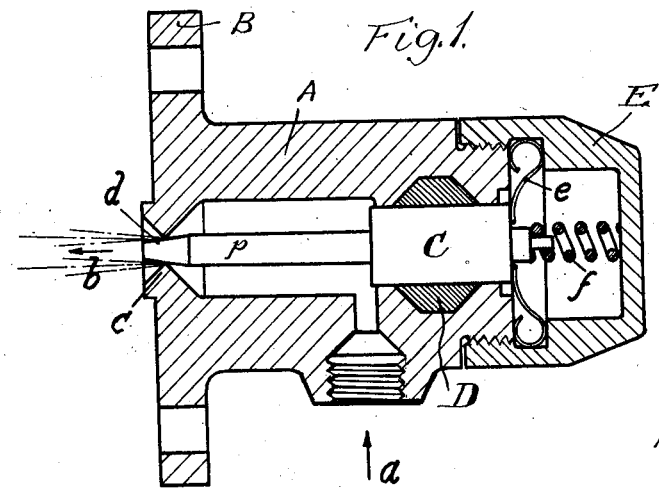
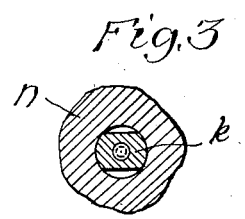
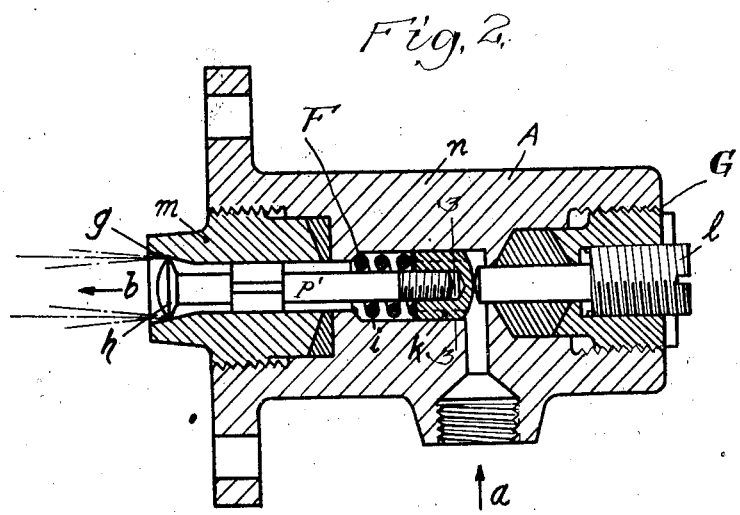
Inventor:
Hermann Dorner
per:
Adolph Zimmermann
Attorney Patented Nov. 6, 1928.

1,690,893

UNITED STATES PATENT OFFICE.

HERMANN DORNER, OF HANOVER, GERMANY.

INJECTION NOZZLE.

Application filed July 27, 1925, Serial No. 46,383, and in Germany April 3, 1924.

The invention relates to injector nozzles more particularly designed for use in connection with internal combustion engines and has for its objects first, the obtaining of a very fine spray or atomization of the liquid fuel passing therethrough; second, the limiting of wear incident to operation.

Generally described my improvement comprises two cooperating members together adapted to form a substantial line contact with each other, one of said members being preferably tapered or conical in form and the other provided with an annular edge, said members being also relatively movable into close proximity to each other to produce an exceedingly narrow annular space therebetween through which the fuel is sprayed. The pressure of the fluid passing through the nozzle is unbalanced and tends to effect a relative movement for enlarging the opening but such movement is yieldably resisted by a relatively high pressure resistance means. However this resistance is only operative when the members are out of contact and therefore does not produce a detrimental impact of the one against the other.

My invention may be embodied in various specific structures but as shown in the drawings;

Figure 1 illustrates a central longitudinal section through one form of my improved injector nozzle.

Figure 2 is a similar view through a modified construction, and

Figure 3 is a cross section on line 3—3 of Figure 2.

As shown in Figure 1 A is the nozzle casing provided with a flange B by means of which it may be secured to the engine casing not shown. Within this casing is arranged a linearly movable needle or valve member p provided at its inner end with a conically tapering portion d extending through an annular substantially knife edge seat portion c on the casing A. The arrangement is such that by suitable adjustment of the member p an exceedingly narrow annular passage b is formed between the same and the seat c.

The casing A is provided preferably on one side thereof with an orifice a through which the liquid fuel is introduced under the pressure of an injector pump (not shown). The needle p has a portion C of enlarged diameter passing through a packing gland D and extending outward into a chamber formed by a cap E which has a threaded engagement with the end of the casing A. Within the chamber in the cap E is a spring e so constructed and arranged as to offer a high resistance to the movement of the needle valve p away from its seat, said resistance pressure however dropping to zero when the valve is in close proximity to its seat. In addition to the spring e is a second spring f of relatively light tension which urges the needle valve toward its seat.

With the construction as thus far described in operation the pressure of the fluid entering through the orifice a and operating on the unbalanced surfaces of the needle valve will tend to move said valve away from its seat. However, the high resistance of the spring e will hold the valve in close proximity to its seat until the fluid pressure has risen sufficiently high to overcome such resistance. The valve will then be moved away from its seat to enlarge the opening for the passage of the fluid. Thus where in an internal combustion engine, the quantity of fuel injected is varied the valve p will automatically adjust its position according to the quantity passing the nozzle while maintaining the high pressure on the fluid.

The construction shown in Figure 2 is modified by substituting for the member p with the tapering end portion b a member p' having a head portion with a peripheral knife edge h for contacting with an inwardly flared seat g. The seat g may be formed upon an insert m which, as shown, has a threaded engagement with the casing A. Surrounding the member p' and within the casing A is a coil spring i which is seated at its inner end against the shoulder F on the casing and at its outer end bears against a collar or cap nut k having a threaded engagement with the end of the member p'. This collar or cap is cut away on opposite sides as shown in Figure 3 to provide passage for the fluid through the casing. l is a stop member having a threaded engagement with the casing so as to be adjustable in relation to the cap member k. As shown, the member l is threaded into a packing gland G having a threaded engagement with the casing A.

With this modified construction the tension of the spring i may be adjusted by the cap k and is such as to offer the required resistance to the movement of the valve away from its seat. The valve is, however, held from actual contact with its seat by adjustment of the stop *l* thereby preventing injury to the knife edge.

With both constructions illustrated the size of the orifice in the nozzle is varied according to the quantity of liquid fuel passing through the same and at all times a high pressure is maintained on said fluid. On the other hand the valve is relieved from any pressure tending to cause an impact of the same against the seat and thus the wearing of either the knife edge or the surface of the cooperating member is largely eliminated.

What I claim as my invention is:

1. In a fuel admission device for internal combustion engines, the combination of two cooperating relatively movable members together adapted to form an annular line contact and means for effecting a high resistant pressure against the movement of one of said members away from the other, said means being substantially inactive when said members are in position of closest approach.

2. In a fuel admission device for internal combustion engines the combination of two relatively movable cooperating members one of which has an annular edge portion and the other a seat portion opposed thereto, means for limiting the pressure urging one of said members toward the other when said members are in close proximity but out of contact and means for effecting a high resistant pressure to the separation of said members from said position of proximity.

3. In a fuel admission device for internal combustion engines, the combination with a valve and its seat, one of which has an annular knife edge and the other a concentric conical surface opposed thereto, said valve being subject to unbalanced fluid pressure urging the same away from its seat, of means operating when and only when said valve is outside the limit of close proximity to its seat for effecting a high resistance yielding pressure against the movement away from its seat.

4. In a fuel admission device for internal combustion engines the combination with a valve and its seat, one of which has an annular substantially knife edge and the other a concentric conical surface opposed thereto, said valve being subject to the unbalanced pressure of the fluid urging the same away from its seat, of means for yieldably resisting the movement of said valve away from its seat, said resistance dropping to approximately the zero point when said valve is in close proximity to its seat.

5. In a fuel admission device for internal combustion engines the combination with a valve and its seat, one of which has an annular substantially knife edge and the other a concentric conical surface opposed thereto, said valve being subject to the unbalanced pressure of the fluid urging the same away from its seat, of means for effecting a high resistance pressure to the movement of said valve away from its seat and a stop holding said valve out of contact with its seat.

6. In a fuel admission device for internal combustion engines the combination with a valve and its seat, one of which has an annular substantially knife edge and the other a concentric conical surface opposed thereto, said valve being subject to the unbalanced pressure of the fluid urging the same away from its seat, of means for effecting a high resistance pressure to the movement of said valve away from its seat and an adjustable stop holding said valve out of contact with said seat permitting its movement into close proximity thereto.

HERMANN DORNER.